US006916518B2

(12) United States Patent
Chen

(10) Patent No.: US 6,916,518 B2
(45) Date of Patent: Jul. 12, 2005

(54) METHOD OF PRODUCING TRANSFER STICKERS WITH METAL POWDER AND TRANSFER STICKERS PRODUCED BY THE METHOD

(76) Inventor: Teng-Kuei Chen, 11Fl., No. 63, Lane 122, Sec. 4, Jen-Ai Rd., Taipei (TW)

( * ) Notice: Subject to any disclaimer, the term of this patent is extended or adjusted under 35 U.S.C. 154(b) by 0 days.

(21) Appl. No.: 10/648,209

(22) Filed: Aug. 27, 2003

(65) Prior Publication Data

US 2004/0035713 A1 Feb. 26, 2004

Related U.S. Application Data

(62) Division of application No. 10/096,915, filed on Mar. 14, 2002, now Pat. No. 6,669,397.

(51) Int. Cl.[7] .................................................. B32B 3/00

(52) U.S. Cl. .................... 428/40.1; 428/40.2; 428/40.5; 428/40.9; 428/41.6; 428/42.1; 428/201; 428/202; 428/914

(58) Field of Search ............................... 428/40.1, 40.2, 428/40.5, 40.9, 41.6, 42.1, 201, 202, 914

(56) References Cited

U.S. PATENT DOCUMENTS

| | | | | |
|---|---|---|---|---|
| 3,043,732 A | * | 7/1962 | Shepherd, Jr. | 156/230 |
| 6,280,553 B1 | * | 8/2001 | Yang | 156/235 |
| 6,699,397 B1 | * | 3/2004 | Chen | 216/54 |

* cited by examiner

*Primary Examiner*—Nasser Ahmad
(74) *Attorney, Agent, or Firm*—Rosenberg, Klein & Lee

(57) ABSTRACT

A transfer sticker with metal powder made by the steps of coating a substrate with a first isolating layer; coating the first isolating layer with a resin layer; coating the resin layer with a metal powder layer by an electroplating process; printing a first protecting resin layer pattern on the metal powder layer; etching the metal powder layer for shape and to cause the patterns to protrude; washing away the etching reagents; printing a second protecting resin layer on the first protecting resin layer to protect the patterns in shape; printing an adhesive layer on the second protecting resin layer; and then attaching a second isolating layer to the adhesive layer. The transfer sticker made in accordance with this method has exquisite patterns that can be transferred completely without other residual parts of the sticker.

9 Claims, 8 Drawing Sheets

METHOD OF PRODUCING TRANSFER STICKERS WITH METAL POWDER AND TRANSFER STICKERS PRODUCED BY THE METHOD

This application is a Divisional Patent Application of patent application Ser. No. 10/096,915 filed on Mar. 14, 2002, now U.S. Pat. No. 6,699,397.

BACKGROUND OF THE INVENTION

1. Field of the Invention

The present invention relates to a method of producing transfer stickers with metal powder, and more particularly to a method using electroplating processes to laminate metal powder on substrates to fabricate stickers having vivid patterns, wherein only the patterns can be transferred from the substrates. The present invention also relates to the structure of the stickers that are made in accordance with this method.

2. Description of Related Art

Many people like to put special patterns on objects even their bodies to improve the appearance, especially kids or teens concerned with current fashions. They use cartoon adhesive paper or tattoo stickers to decorate objects or their bodies.

Conventional methods of producing stickers use three kinds of procedures.

1. Gilding: As shown in FIG. 8, a base layer (60) made of a paper or plastic membrane is prepared, and then one side of the base layer (60) is coated with an adhesive layer (61). An isolating layer (62), which can be easily separated from the adhesive layer (61), covers the adhesive layer (61) to keep the adhesive layer (61) from sticking to other undesired places. A gilding layer (63) is printed on the other side of the base layer (60) in patterns. Finally, a cutter (not shown) is used to trim along a cutting line (64) around the gilding layer (63), i.e. the pattern, to make the gilding layer (63) detachable from other parts of the sticker.

2. Vaporizing: As shown in FIG. 9, a base layer (70) made of a paper or plastic membrane is prepared, and then one side of the base layer (70) is coated with an adhesive layer (72). A laser pattern layer (71) is formed on the other side of the base layer (70) by vaporization to form patterns on the base layer (70). An isolating layer (73), which can be easily detached from the adhesive layer (72), is mounted on the adhesive layer (72) to keep the adhesive layer (72) from sticking to other undesired places. Finally, a cutter having specific shape cuts along a cutting line (74) so the laser pattern layer (71) can be separated from the isolating layer (73).

3. Etching: as shown in FIG. 10, a base layer (82) made of nylon is prepared, and then one side of the base layer (82) is coated with an adhesive layer (81). An isolating layer (80), which can be easily detached from the adhesive layer (81), is attached to an exposed side of the adhesive layer (81) to keep the adhesive layer from sticking to other undesired places. A metal powder layer (83) coats the other side of the base layer (82) by vaporization to cover the whole surface of the base layer (82). An ink layer (84) is printed on the metal powder layer (83) in a specific pattern, and then an acid solution is used to etch the metal powder layer (83) not covered with the ink layer (84) to form patterns on the base layer (82). After etching, the ink layer (84) is removed from the metal powder layer (83) by a washing process to complete the sticker. When the sticker is used, the adhesive layer (81) is detached from the isolating layer (80), and then the whole base layer (82) with the emerged patterns is attached to a desired place.

Stickers made using the first and second methods have inaccurate boundaries around the patterns because the cutter is often not precisely matched with the cutting lines (64, 74) around the patterns. Therefore, the pattern may be partially cut out, or margins may be left around the patterns to make the sticker coarse.

As to the third method, the patterns and other parts of the sticker such as the base layer (82) must be attached to objects to transfer the patterns. Thus, such a sticker is also coarse for decoration.

The present invention has arisen to mitigate and/or obviate the disadvantages of the conventional method of producing transfer stickers.

SUMMARY OF THE INVENTION

A main objective of the present invention is to provide a method of producing transfer stickers with metal powder by electroplating processes, wherein only the desired patterns are transferred to objects.

Further benefits and advantages of the present invention will become apparent after a careful reading of the detailed description with appropriate reference to the accompanying drawings.

DETAILED DESCRIPTION OF THE INVENTION

Figure 1:
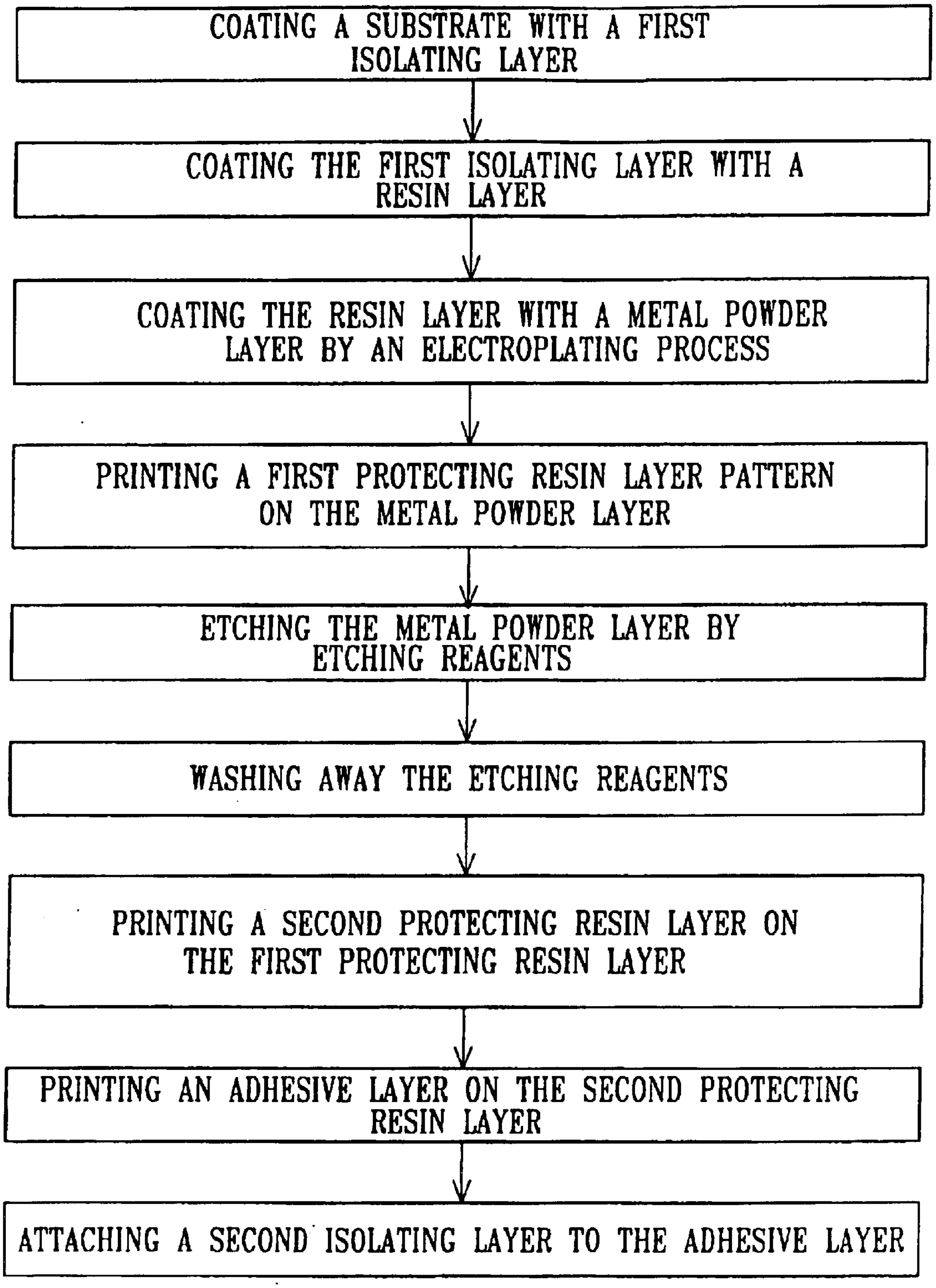
FIG. 1 is a flow chart of a method of producing transfer stickers with metal powder in accordance with the present invention.
Figure 2:
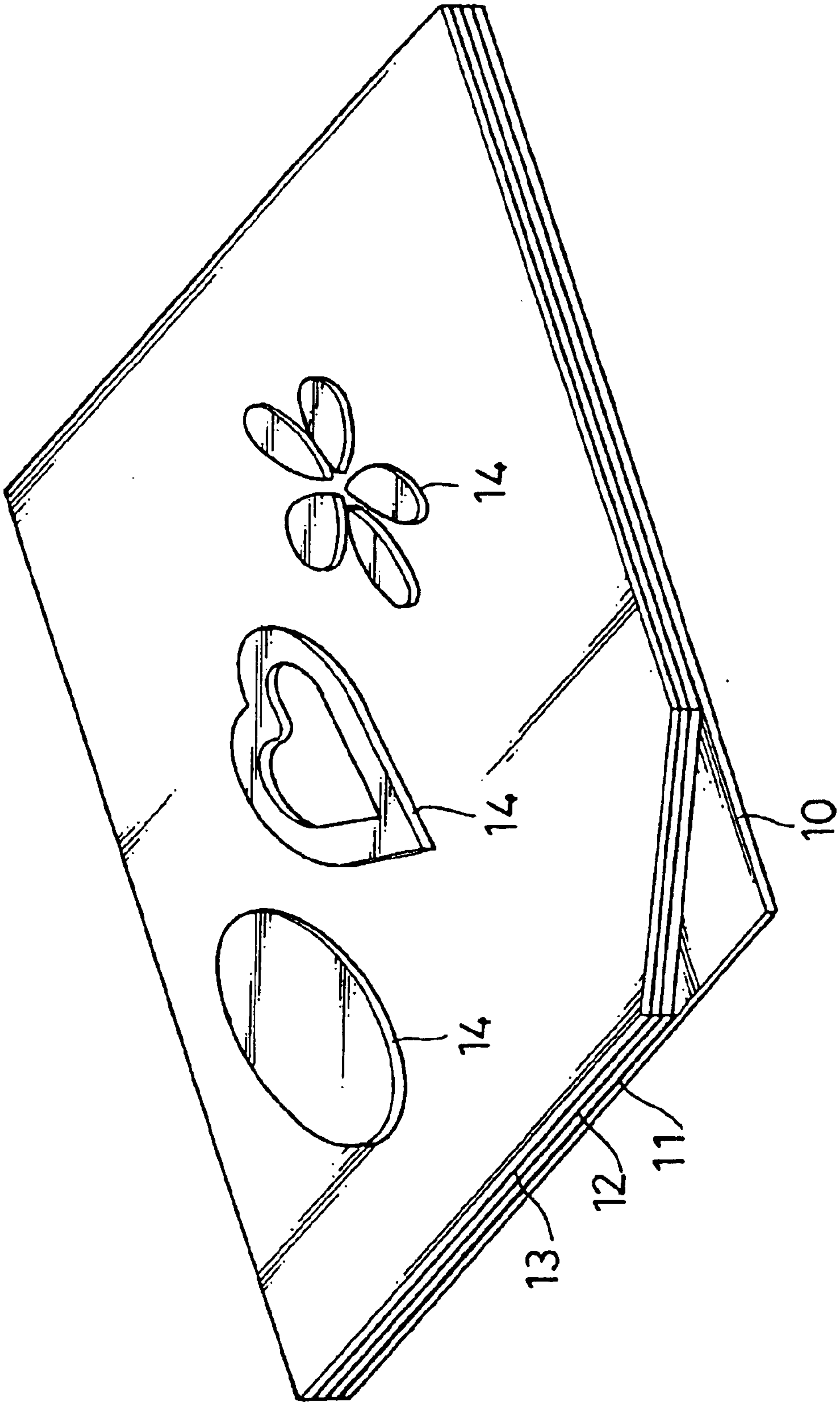
FIG. 2 is a perspective view in partial section of a sticker in accordance with the present invention, wherein a shaped resin layer is mounted on a metal powder layer.
Figure 3:
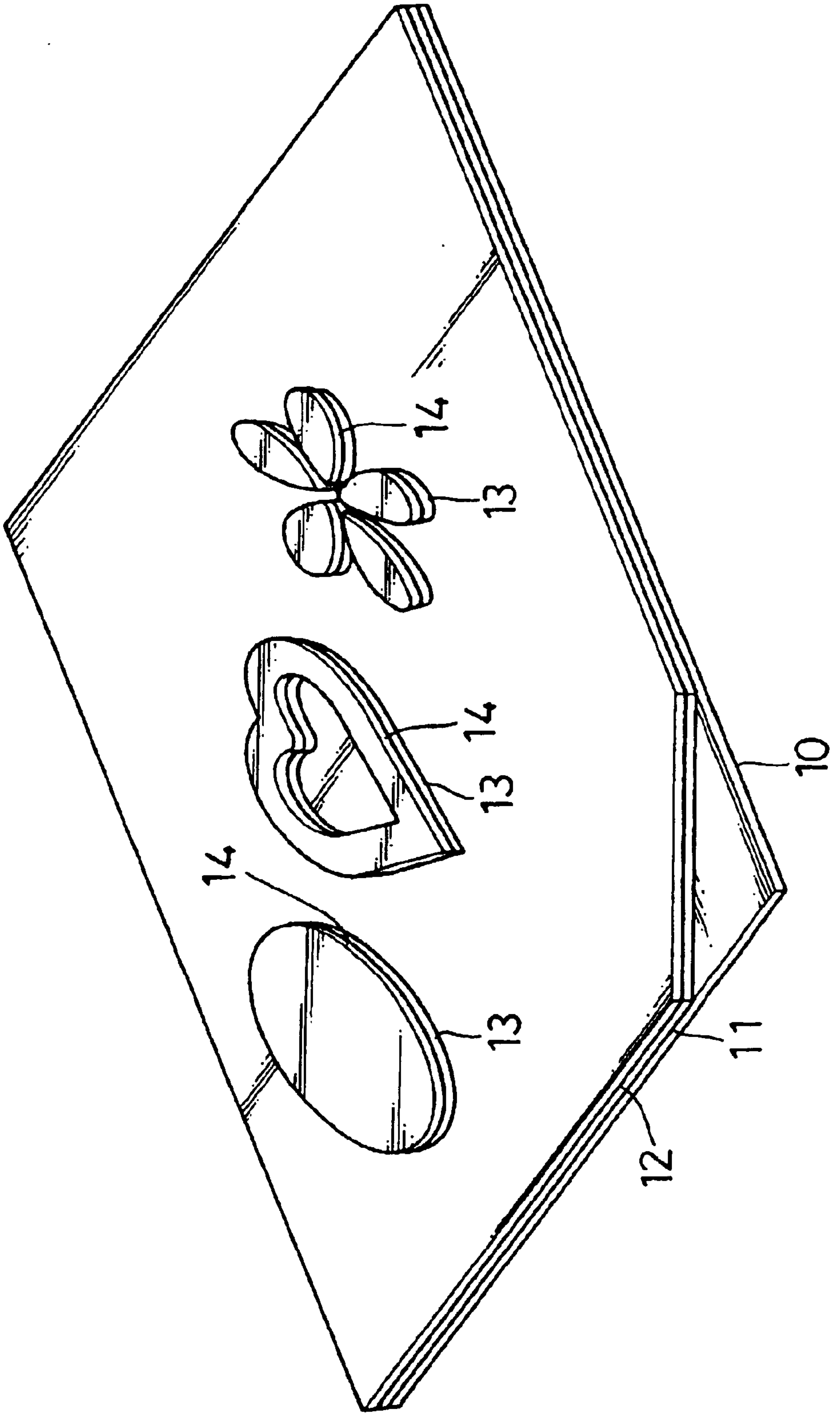
FIG. 3 is a perspective view in partial section of the sticker in accordance with the present invention after etching the metal powder layer.
Figure 4:
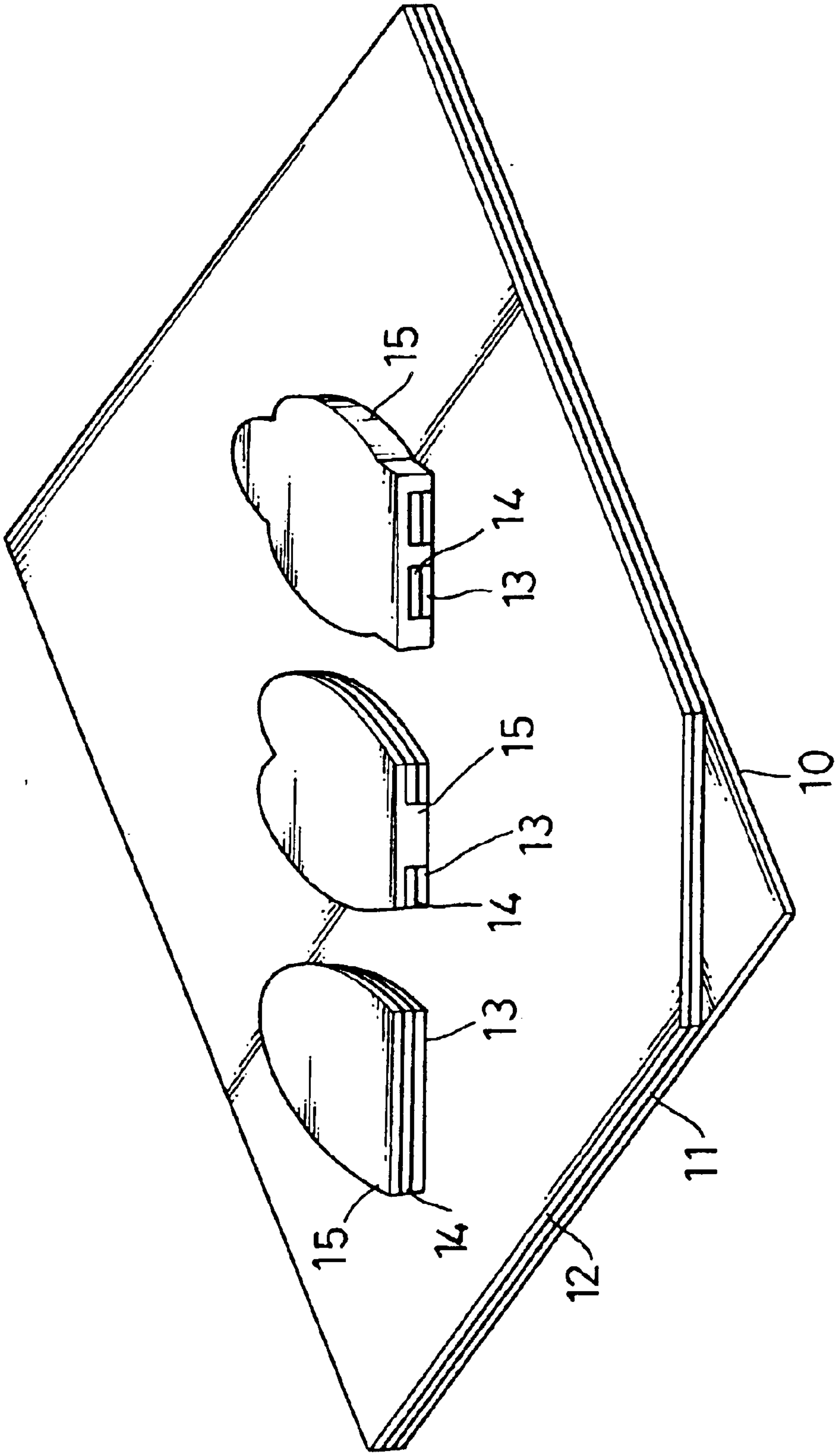
FIG. 4 is a perspective view of the sticker in accordance with the present invention with a protecting layer mounted on the patterns.
Figure 5:
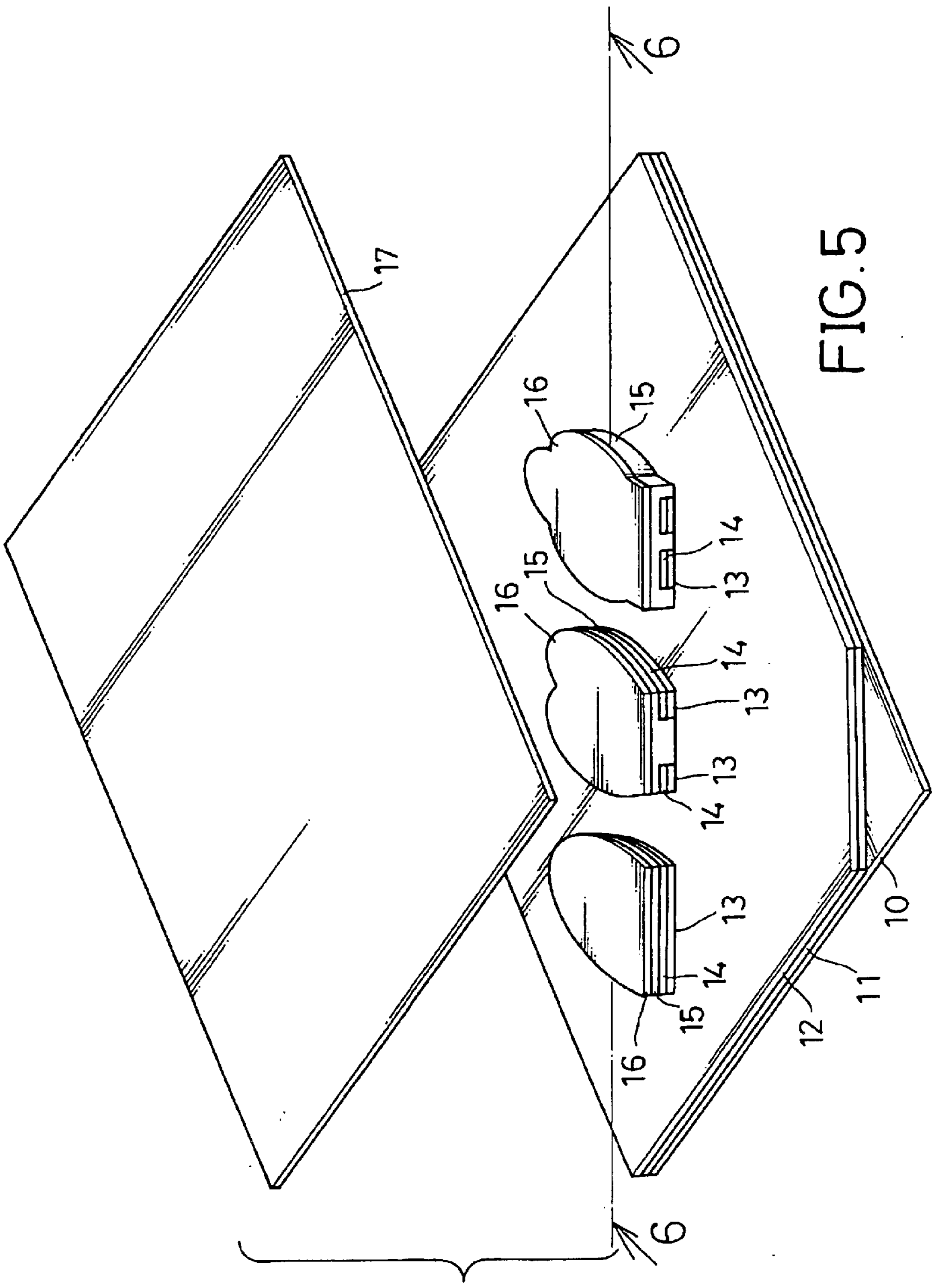
FIG. 5 is a perspective view of the sticker in accordance with the present invention with an adhesive layer attached to the protecting layer.
Figure 6:
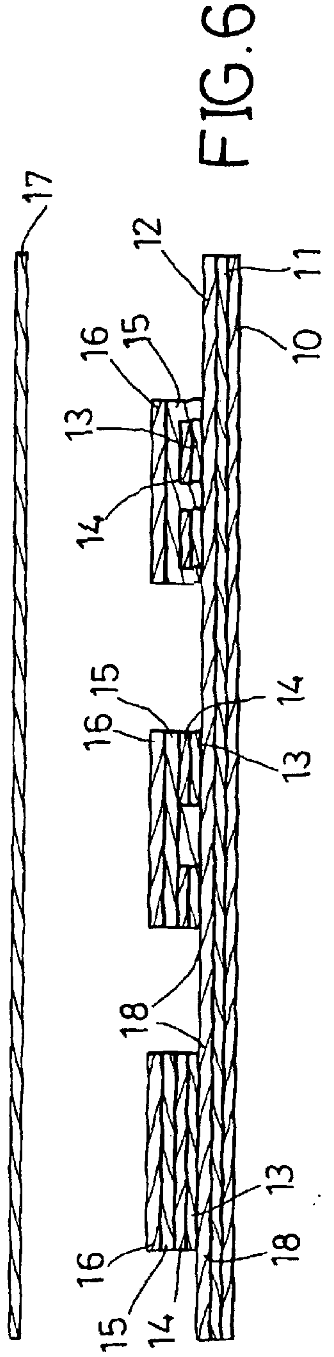
FIG. 6 is a cross-sectional side plan view of the sticker along line 6—6 in FIG. 5.

With reference to FIGS. 1 to 7, a method of producing transfer stickers with metal powder in accordance with the present invention comprises the steps of (a) coating a substrate with a first isolating layer; (b) coating the first isolating layer with a resin layer; (c) coating the resin layer with a metal powder layer by an electroplating process; (d) printing a first protecting resin layer pattern on the metal powder layer; (e) etching the metal powder layer not covered by the first protecting resin layer to for shape and to cause the patterns to protrude by acid or base etching reagents; (f) washing away the etching reagents; (g) printing a second protecting resin layer on the first protecting resin layer to protect the patterns in shape; (h) printing an adhesive layer on the second protecting resin layer; and (i) attaching a second isolating layer to the adhesive layer.

Whereby, a transfer sticker with metal powder is completed.

In step (a), a substrate (10) is prepared and a first isolating layer (11) is coated on the substrate (10). The first isolating layer (11) enables to be easily detached from the substrate (10).

In step (b), coating said first isolating layer (11) with a resin layer (12) having vivid colors, the resin layer (12) is transparent or selectively dyed in some light colors or has colorful powder visibly contained inside so as to make the resin layer (12) have an attractive appearance.

In step (c), coating the resin layer (12) with a metal powder layer (13) by an electroplating processes and then pressing the metal powder layer (13) with a molding machine to form light-reflecting laser patterns on the metal powder layer (13).

In step (d), a first protecting resin layer (14) is printed on the metal powder layer (13) in specific shapes to cover the metal powder layer (13).

Then, in step (e), etching reagents such as an acid solution or base solution is used to etch the metal powder layer (13) that is not covered by the first protecting resin layer (14) to make the patterns protrude. An acid solution has better etching efficiency then a base solution.

In step (f), the sticker is washed with water until the etching reagents are completely removed.

In step (g), a second protecting resin layer (15) coats the first protecting resin layer (14) to emphasize and protect a clear configuration or shape of the patterns.

In step (h), an adhesive layer (16) is printed on the second protecting resin layer (15) so that the transfer sticker can be attached to an object.

In the last step (i), an isolating layer (17) that is easily detached from the adhesive layer (16) is attached on the adhesive layer (16) for protection. Multiple split lines (18) are formed around roots of the patterns to easily detach the patterns from the first isolating layer (11) with part of the resin layer (12). Then, the transfer sticker with metal powder is completed.

The substrate (10) is made of materials selected from paper or plastic membrane that can be combined with the isolating layer (11). The isolating layer is made of wax silicone or other materials easily separated from the substrate (10) after they solidify. Additionally, the resin layer (12), the first protecting resin layer (14) and the second protecting resin layer (15) are all made of resin.

Before washing in step (f), a neutralizing reagent that has nullifying properties to the corrosive solutions is used to moderate the corrosive solutions. For example, when the corrosive solution is acid, a base neutralizing reagent is used to neutralize the acid corrosive solution. Then, all reagents and solutions are washed and removed from the sticker by water.

The second protecting resin layer (15) in step (h) coating the first protecting resin layer (14) has an equal or larger area than the first protecting resin layer's (14) area. The second protecting resin layer (15) can be composed of multiple layers and at least one of the multiple layers of the second protecting resin layer (15) is mixed with colors to make the second protecting resin layer (15) have a vivid appearance. Additionally, the at least one of the multiple layers can be mixed with fluorescence materials to make the second protecting resin layer (15) have luminance or be mixed with colorful bright powders to make the second protecting resin layer (15) shine and sparkle.

To apply the transfer sticker to an object, the isolating layer (17) is removed from the adhesive layer (16) to expose the adhesive. Thus, the patterns composed of the second protecting resin layer (15), the first protecting resin layer (14), the metal powder layer (13), and the resin layer (12) can be stuck on surfaces (19) of an object by the adhesive layer (16). After being attached to a surface (19) of an object, the first isolating layer (11) is detached from the resin layer (12) within the split line (18). The adhesive force between the adhesive layer (16) and the object is greater than the attractive force between the resin layer (12) and the first isolating layer (11) so that the patterns can be easily stuck and transferred to other objects from the first isolating layer (11).

Figure 7:
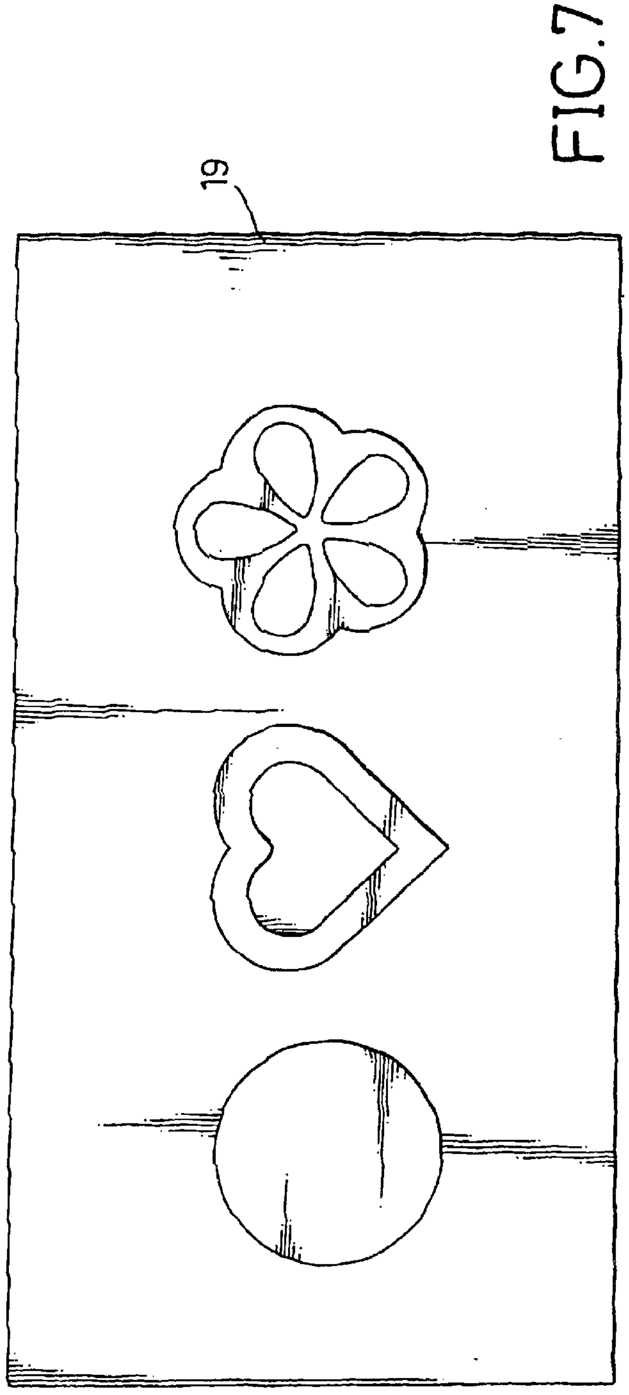
FIG. 7 is a top plan view of the sticker in FIG. 5 showing the patterns transferred to a desired surface.
Figure 8:
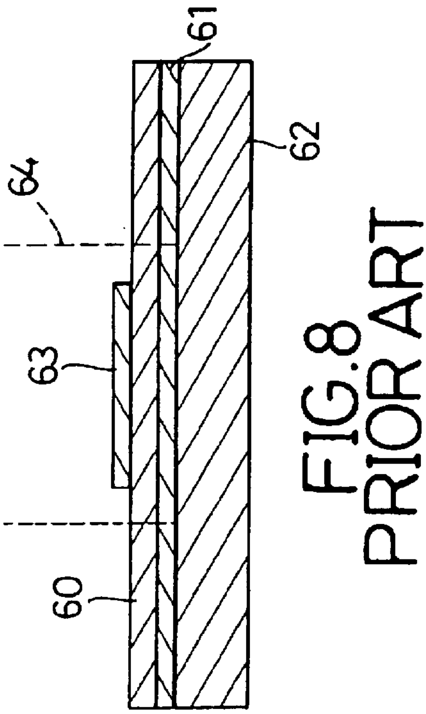
FIG.8 PRIOR ART
FIG. 8 is a cross-sectional side plan view of a first conventional type of sticker.
Figure 9:
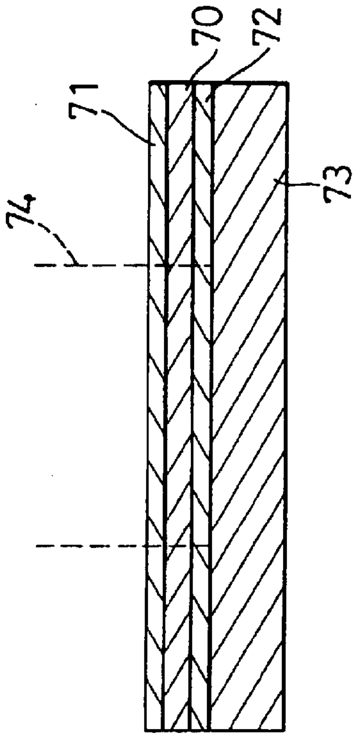
FIG.9 PRIOR ART
FIG. 9 is a cross-sectional side plan view of a second conventional type of sticker.
Figure 10:
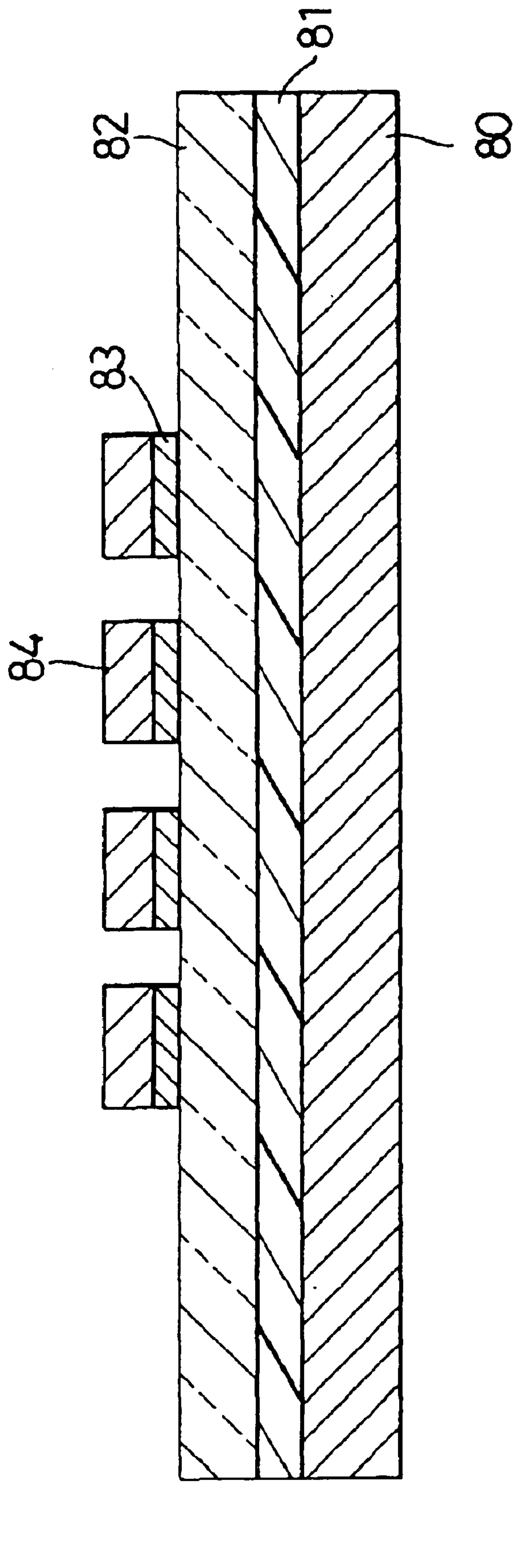
FIG.10 PRIOR ART
FIG. 10 is a cross-sectional side plan view of a third conventional type of sticker.

Only the patterns are transferred to the objects without other residual parts of the transfer sticker, as shown in FIG. 7. The resin layer (12), the first protecting resin layer (14) and the second protecting resin layer (15) are colored and coated around the metal powder layer (13) to increase versatility of the transfer sticker and to protect the metal powder layer (13). Thus, the transfer sticker is trimmed, exquisite and attractive.

Although the invention has been explained in relation to its preferred embodiment, it is to be understood that many other possible modifications and variations can be made without departing from the spirit and scope of the invention as hereinafter claimed.

What is claimed is:

1. A transfer sticker having metal powder made by an electroplating process, the transfer sticker comprising:

a substrate;

a first isolating layer coated on the substrate;

a resin layer detachably coated directly on the first isolating layer;

a metal powder layer electroplated on the resin layer;

a first protective resin layer printed on the metal powder layer in patterns;

a second protective resin layer printed to overlay and capture the first protective resin layer over the metal powder layer to protect the patterns;

an adhesive layer coated on the second protective resin layer; and a second isolating layer detachably covering the adhesive layer.

2. The transfer sticker as claimed in claim 1, wherein the substrate is made of materials selected from the group comprising paper and plastic membrane.

3. The transfer sticker as claimed in claim 1, wherein the first and second isolating layers are made of materials selected from the group comprising: wax and silicone.

4. The transfer sticker as claimed in claim 1, wherein the resin layer, the first protective resin layer and the second protective resin layer are all made of resin.

5. The transfer sticker as claimed in claim 4, wherein the resin layer is transparent and formed with a predetermined color.

6. The transfer sticker as claimed in claim 1, wherein the second protective resin layer coating the first protective resin layer has an equal or larger area than the first protective resin layer.

7. The transfer sticker as claimed in claim 1, wherein the second protective resin layer is composed of multiple layers.

8. The transfer sticker as claimed in claim 7, wherein at least one of the multiple layers of the second protective resin layer is mixed with colors.

9. The transfer sticker as claimed in claim 7, wherein at least one of the multiple layers is mixed with fluorescence materials.

* * * * *